W. H. HOVEY.
Harvester Rake.
No. 14,693.
Patented April 15, 1856.
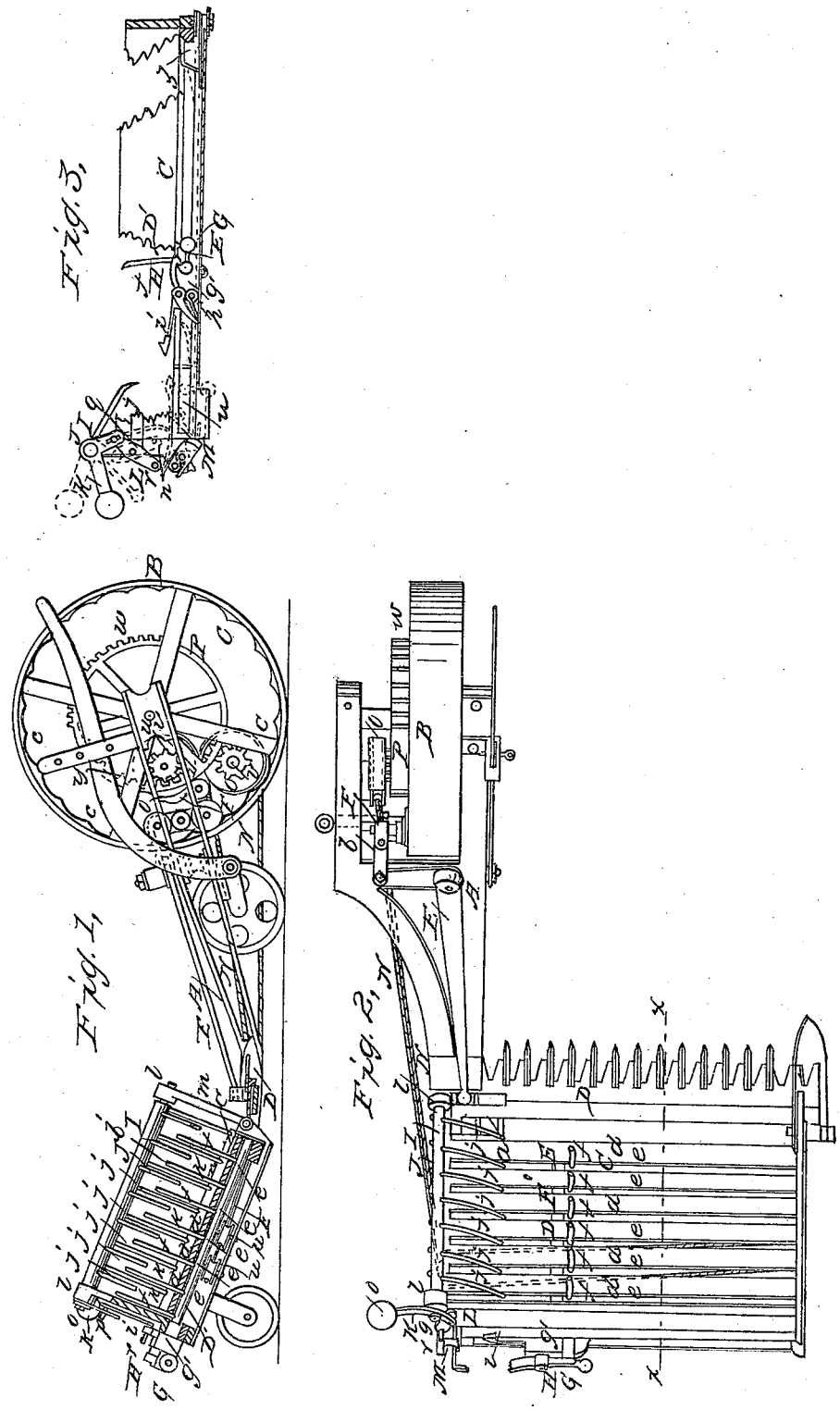

UNITED STATES PATENT OFFICE.

WM. H. HOVEY, OF SPRINGFIELD, MASSACHUSETTS.

IMPROVEMENT IN HARVESTER RAKING ATTACHMENTS.

Specification forming part of Letters Patent No. 14,693, dated April 15, 1856.

*To all whom it may concern:*

Be it known that I, WILLIAM H. HOVEY, of Springfield, in the county of Hampden and State of Massachusetts, have invented a new and Improved Raking Attachment to be Applied to Reapers; and I do hereby declare that the following is a full, clear, and exact description of the same, reference being had to the annexed drawings, making a part of this specification, in which—

Figure 1 is an inner side view of a reaper with my improvement applied to it, the platform of the reaper being bisected transversely, as indicated by the line $x\ x$, Fig. 2. Fig. 2 is a plan or top view of the same. Fig. 3 is a back view of the platform of the same.

Similar letters of reference indicate corresponding parts in the several figures.

My invention consists in the employment or use of a reciprocating rake, and also a swinging rake applied to the platform, and arranged and operating as will be presently shown and described.

To enable others skilled in the art to fully understand and construct my invention, I will proceed to describe it.

A, Figs. 1 and 2, represents the main frame of the machine, in which the driving-wheel B is placed, and C is the platform, which is attached by a joint or hinge, $a$, to the back end of the main frame.

D is the sickle, which is driven by a right-angled or bent pitman, E, connected by a link, $b$, with a rock-lever, F, operating by projections $c$ on the inner periphery of the driving-wheel B. The platform C is formed of slats $d$, placed at suitable distances apart, so as to allow spaces $e$ between them, and a rake, D', works underneath the platform, said rake being formed of curved teeth $f$, which are secured in a head, E', the ends of which are fitted in blocks $g\ g'$, which are attached one at each end of a bar, F', which works in guides underneath the platform. One end of the head E' has a weighted arm, G, attached to it, and a catch-bar, H, is attached to the block $g'$ at the back side of the platform, said catch-bar having a spring, $h$, bearing against its under side. A catch, $i$, is also attached to the block $g'$, as shown clearly in Figs. 2 and 3.

I is a swinging rake, the head J of which has two sets of teeth, $j\ k$, attached to it. The teeth $j$ are of curved form, but the teeth $k$ are straight, the two sets of teeth forming an angle of about forty-five degrees with each other. (See Fig. 3.) The head J of this rake is fitted in proper bearings, $l\ l$, in the upper ends of uprights $m\ m$, which are attached to the inner ends of the platform C, and the lower ends of the teeth $k$ have a bar, $n$, attached to them, which bar just clears the end of the platform. One end of the head J has a right-angled or bent arm, K, attached to it, provided with an arm, O, at the end of its upper arm. The lower arm is slotted, and a pin, $p$, at the upper end of a lever, L, fits in the slot. The lever L works on a pivot, $q$, attached to one of the uprights $m$, said pivot passing through the center of the lever L. The lower end of the lever L has a pin, $r$, attached to it.

M is a catch, which works on a pivot, $s$, at the back side of the platform and directly below the lever L. The catch M holds up the weight $o$ and keeps the teeth $k$ of the rake I in a vertical position. The weighted arm G keeps the teeth $f$ of the rake in a horizontal position below the slats $d$.

N N are chains, both of which are attached at one end to the bar F'. One chain passes around a pulley, $t$, underneath the outer end of the platform, and both chains pass around pulleys $u\ u$, underneath the inner end of the platform. The opposite ends of the chains are attached to pulleys O O, fitted in the main frame A. These pulleys have each a pinion, $v$, on their inner sides, both of which are shown in Fig. 1.

On the axle of the driving-wheel B there is placed loosely a wheel, P, which has teeth $w$ on a portion of its outer periphery and teeth $y$ on a portion of its inner periphery. These teeth gear respectively into the pinions $v$, one pinion being in gear while the other is out of gear; or the pinions may be described as gearing alternately into the teeth $w\ y$.

Operation: As the machine is drawn along the rake D' is moved back to the outer end of the platform, in consequence of the teeth $w$ on the outer periphery of the wheel P gearing into the pinion on the lower pulley O, the teeth $f$ of the rake D' being kept in a horizontal position below the platform by means of the weighted arm G. When the rake D' reaches the outer end of the platform the teeth are elevated above the slats $d$ by an incline, $z$, at the outer end of the platform, and held in an elevated position by the catch-bar H, which fits over a projection on the end of the head E'. The teeth w on the wheel P leave the lower pinion, v, at this point or position of the rake, and the teeth y of the inner periphery of the wheel P gear into the upper pinion, v, and the rake D' is moved from the outer to the inner end of the platform C, and the cut grain upon the platform is raked up against the teeth k and underneath the teeth j of the rake I. At this point or position of the rake D' the catch i acts upon the catch M and throws it free from the lower end of the lever L, and as the rake returns the catch i will draw back the lower end of the lever L, the catch drawing upon the pin r, and the rake I will be turned, the teeth j throwing the cut grain from the platform, the rake returning to its original position as soon as the pin r is freed from the catch i by means of the weight o.

I am aware that a reciprocating rake, D', working through a slotted platform has been previously used, and I therefore do not claim said rake separately; but,

Having thus described my invention, what I claim as new, and desire to secure by Letters Patent, is—

1. The swinging rake I, in combination with the reciprocating rake D', when said rakes are used in connection with the device for operating the rake I, formed as shown—viz., of the catch M, lever L, with pin p attached, arms K O, and the catch-bar H, attached to the rake D', whereby the proper movements are given at the desired time to the rake I, as described, for the purpose specified.

2. Operating the reciprocating rake D' by means of the chains N N, attached to said rake, as shown, and passing around the pulleys t u u, and attached to the pulleys O O, which pulleys are turned or operated alternately by the wheel P, having teeth w y upon its outer and inner peripheries, substantially as described.

WM. H. HOVEY.

Witnesses:
WM. P. ALLIS,
A. L. SOULE.